March 13, 1962  J. B. NICHOLS  3,025,026
SUPPLEMENTAL FLIGHT CONTROLS FOR AIRCRAFT
Filed Aug. 24, 1959
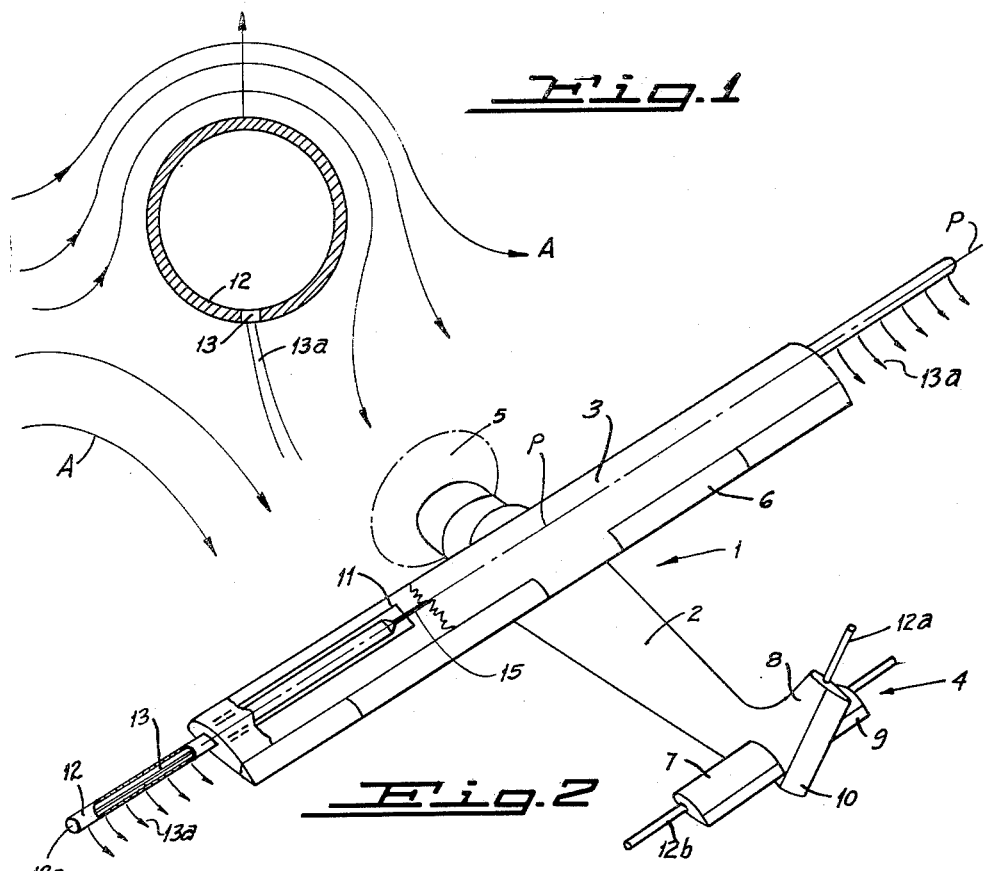
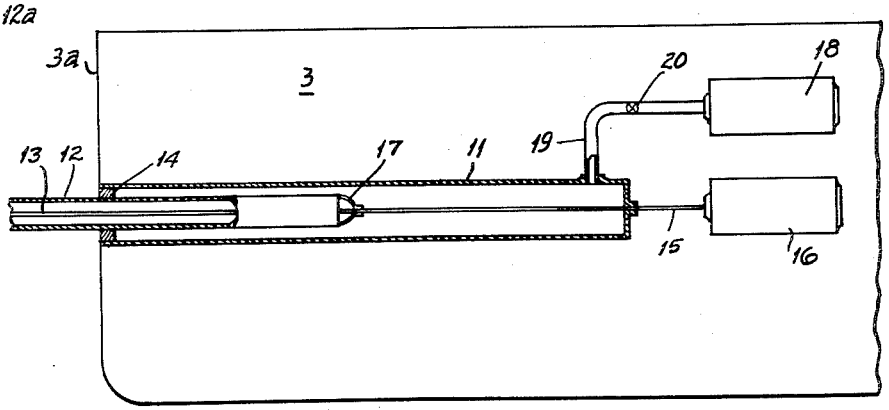
INVENTOR.
JOHN B. NICHOLS
BY
*Fryre + Johnson*
ATTORNEYS

United States Patent Office 3,025,026
Patented Mar. 13, 1962

3,025,026
SUPPLEMENTAL FLIGHT CONTROLS
FOR AIRCRAFT
John B. Nichols, Atherton, Calif., assignor, by mesne assignments, to Hiller Aircraft Corp., Palo Alto, Calif., a corporation of California
Filed Aug. 24, 1959, Ser. No. 835,785
9 Claims. (Cl. 244—87)

This invention relates to supplemental flight controls for aircraft and, more particularly, to auxiliary systems for improving the control characteristics of aircraft during conditions of slow flight, as during a steep take-off, climbing and landing.

Many types of aircraft, particularly those of the steep take-off and landing type fly at extremely low speeds during take-off and landing. During such slow flight, the airflow over the wings, ailerons, tail surfaces, etc. is often unsatisfactory for flight control. Because of the poor airflow, not only are the control forces reduced, but the aerodynamic damping and stability depreciates materially while the sensitivity to gusts increases. In order to overcome this deficiency in flight control, others have provided power control systems, such as air jets, which deliver positive forces to maintain or adjust flight characteristics. Such systems are effective even at low speeds but their power requirements render them impracticable in many applications. Others have improved the control characteristics during slow flights by temporarily increasing the area of the control surfaces, i.e. by providing extensible airfoil sections which may be telescoped outwardly to increase the airfoil area. However, such systems are not as effective or sensitive as the power systems.

It is, therefore, an object of this invention to provide a slow flight control system combining the features of power control systems and telescopic airfoils.

It is a further object of this invention to provide a supplemental flight control system including a power control element having airfoil characteristics for further aerodynamic control.

An aircraft embodying features of this invention would include an extensible tubular member which may be circular or of airfoil cross-section carried in each wing and, if desired, in control members of the tail assembly. The tubular member is disposed spanwise of the wing and slidably carried therein so that at low speeds it may be moved outwardly to an active position projecting beyond the end of the wing. A slot in the tubular member is conditioned to eject a sheet of compressed air or similar pressure fluid from the projecting portion of the tubular member in a direction whereby the reactive forces will supplement the aerodynamic forces acting on the wing. Additionally, the airstream flowing around the tubular member impinges upon the high pressure sheet of air which forms a barrier to act as a trailing surface of the tubular member, i.e. a jet flap, and form an airfoil therewith to increase the effective surface of the wing with which the tubular member is associated.

Other objects and advantages of this invention will become apparent from the specification following when read in connection with the accompanying drawings wherein:

FIG. 1 is a schematic cross-section view of tubular member supplementing the normal control system;

FIG. 2 is an isometric view of an aircraft embodying features of this invention; and FIG. 3 is a more or less schematic section view of a wing or other airfoil member embodying features of this invention.

Referring now to the drawings in particular, there is shown an aircraft 1, including a fuselage 2, wings 3, tail assembly 4 and forward thrust producing means, such as a propeller 5. The wings 3 include ailerons 6 and other flight control members, while the tail assembly includes the horizontal and vertical tail members 7 and 8 carrying elevators 9 and rudder 10, respectively. When the aircraft is in stages of slow flight, as in steep take-off or during landing approaches, the speed of air-stream passing over the wings and flight control surfaces is reduced appreciably. Consequently, the effectiveness of these surfaces is materially reduced. Means for alleviating this condition is a material feature of this invention.

Carried in each wing 3 along the center of pressure or zero pitch axis P is a cylindrical casing 11 in which is slidably carried a tubular member 12 closed at the outer end 12a and having an elongated slot 13 in the lower portion thereof. A seal 14 in the outboard end of the casing 11 embraces and slidably receives the tubular member 12 so that the effective length of the slot 13 is measured by the portion thereof outward of the seal 14. The tubular member 12 is movable longitudinally within the casing 11 by means of a push rod 15 operated by suitable reciprocating means such as a hydraulic cylinder 16. The rod 15 is connected to the tubular member by a spider 17 which permits free ingress of fluid from the casing 11 into the tubular member 12. A suitable means, such as an air compressor 18 is provided to deliver fluid under pressure through a conduit 19 to the casing 11 and tubular member 12 under the control of a valve 20.

Thus, under the pilot's control, the tubular member may be moved outwardly through the casing 11 to project from the end of the wing 3 and the air compressor 18 operated to project a sheet of compressed air from the slot 13 extending beyond the seals 14. The amount of flow of compressed air may be controlled approximately by adjusting the amount of the elongated slot 13 projecting beyond the end seal 14 on the wing 3, and more accurately by manipulation of a suitable valve 20. Since the tubular member is on the center of pressure or zero pitch axis P the pitching of the aircraft 1 during operation of the jet is minimized.

Referring now to FIG. 1, the high pressure gas jetting from the slot 13 in the tubular member 12 forms a sheet 13a constituting a continuation of the undersurface of the member 12 to resist the air stream A impinging thereon. Since the air stream flows quickly over the smooth upper contour of the tubular member 12 forming a low pressure area, the impingement of other portions of the air stream upon the airfoil extension formed by the jet sheet 13a produces a component of lift against the composite tube-jet sheet airfoil which is transferred to the wing 3. In essence, the jet sheet induces the necessary circulation of the airstream for imparting lift to the circular airfoil extension. Additionally, the action of the jet stream itself produces an additional reactive component of lift similarly transferred to the wings.

Referring to FIG. 2, it can be seen that similar tubular members 12a and 12b can be provided in the vertical tail member in the horizontal tail plane.

While a specific embodiment of this invention has been described, it is apparent that modification and changes therein can be made without departing from the spirit and scope of this invention, which should be limited only by the claims appended hereto.

What is claimed as invention is:

1. In combination with an airfoil member against which an air stream is adapted to exert a pressure in a given direction relative thereto, means for increasing the susceptibility of said airfoil to said pressure comprising,
  a tubular member extending from and beyond the tip end of said airfoil member,
  said tubular member having an elongate longitudinal slot therein,
  a source of pressure fluid, and
  selectively operated means connecting said tubular member to said source to project a sheet of said pressure fluid therefrom,
  said longitudinal slot being along the lower part of said tubular member so that said sheet is ejected downwardly with respect to said airfoil member to be impinged upon by and provide a barrier to said air stream to thereby resist said air stream and produce a component of force in said given direction.

2. In combination with an airfoil member against which an air stream is adapted to exert a pressure in a given direction relative thereto, means for increasing the susceptibility of said airfoil to said pressure comprising,
  a tubular member carried on said airfoil member for slidable movement in a spanwise direction with respect to said airfoil,
  means for selectively moving said tubular member to a position wherein it projects beyond the tip end of said airfoil,
  said tubular member having an elongate longitudinal slot therein,
  a source of pressure fluid, and
  selectively operated means connecting said tubular member to said source to project a sheet of said pressure fluid therefrom,
  said longitudinal slot being along the lower part of said tubular member so that said sheet is ejected downwardly with respect to said airfoil member to be impinged upon by and provide a barrier to said air stream to thereby resist said air stream and produce a component of force in said given direction.

3. In combination with an airfoil member adapted to be moved laterally through an air stream so that the air stream exerts a force component thereon in a given direction transverse to the spanwise axis thereof, means for increasing the susceptibility of said airfoil to said force comprising,
  a tubular member in said airfoil disposed parallel to said spanwise axis, said tubular member being longitudinally slidable from a recessed position within said airfoil to be extended gradiently beyond the end of said airfoil,
  said tubular member having an elongate longitudinal slot therein,
  a source of pressure fluid, and
  selectively operated means connecting said tubular member to said source to project a sheet of said pressure fluid therefrom,
  said longitudinal slot being along the lower part of said tubular member so that said sheet is ejected downwardly with respect to said airfoil member to be impinged upon by said air stream to produce a component of lift force in said given direction.

4. In combination with an airfoil member adapted to be moved through an air stream so that the air stream exerts a force against a lift surface, means for increasing the lift characteristics of said airfoil comprising,
  a hollow vessel carried on said airfoil member, said vessel being movable from a recessed position within the area of said lift surface to be extended gradiently beyond the tip end of said lift surface, said vessel having an elongate longitudinal slot therein,
  a source of pressure fluid,
  means connecting said vessel to said source,
  selectively operated means for releasing said pressure fluid through said slot to eject a sheet of said pressure fluid therefrom,
  said longitudinal slot being so disposed angularly that said sheet is ejected transversely of said lift surface to provide a barrier to and thereby resist said air stream.

5. In combination, with an airfoil,
  a spanwise recess in said airfoil,
  an elongate tubular member longitudinally slidable in said recess,
  annular seal means on said airfoil at the outer end of said recess snugly embracing said tubular member,
  said tubular member having an elongate longitudinal slot therein which is gradiently opened to communication with the atmosphere adjacent said airfoil as said tubular member slides longitudinally through said annular seal, and
  a source of pressure fluid connected to said tubular member to be ejected from portions of said slot in communication with the atmosphere,
  said longitudinal slot being along the lower part of said tubular member so as to eject a sheet of said pressure fluid downwardly to be impinged upon by an air stream to produce a component of lift thereagainst.

6. In an aircraft having a horizontal airfoil member, the combination with said member of
  a spanwise recess in said airfoil,
  an elongate tubular member longitudinally slidable in said recess,
  annular seal means on said airfoil at the outer end of said recess snugly embracing said tubular member,
  said tubular member having a longitudinal slot therein, and
  a source of pressure fluid connected to said tubular member so as to be ejected through a portion of said slot outside said annular seal means,
  said longitudinal slot being disposed along the bottom of said tubular member to eject a sheet of air downward therefrom.

7. In combination with an airfoil against which an air stream is adapted to exert a pressure in a given direction relative thereto; means for increasing the susceptibility of said airfoil to said pressure comprising a single tubular member extending spanwise of said airfoil and supported by said airfoil substantially along the center of pressure thereof for slidable movement in a spanwise direction, means for selectively moving said tubular member to a position wherein it projects beyond the tip end of said airfoil, said tubular member having an apertured portion extending longitudinally thereof, a source of pressure fluid, and selectively operable means connecting said tubular member to said source to project a sheet of pressure fluid from said apertured portion, said apertured portion being along the lower part of said tubular member so that when said tubular member is projected beyond the tip end of said airfoil said sheet is ejected downwardly with respect to said airfoil to be impinged upon by and provide a barrier to said air stream to thereby resist said air stream and produce a component of force in said given direction.

8. In combination with an airfoil against which an air stream is adapted to exert a pressure in a given direction relative thereto; means for increasing the susceptibility of said airfoil to said pressure comprising a single tubular member extending spanwise of said airfoil and supported by said airfoil substantially along the center of pressure thereof for slidable movement in a spanwise direction, means for selectively moving said tubular member to a position wherein it projects beyond the tip end of said airfoil, said tubular member having an apertured portion extending longitudinally thereof along the lower part thereof, a source of pressure fluid, and selectively operable means connecting said tubular member to said source to project a sheet of pressure fluid downwardly through said lower apertured portion when said tubular member is projected beyond the tip end of said airfoil to provide a barrier to said air stream to thereby resist said air stream and produce a component of force in said given direction.

9. The combination of claim 8 in which said tubular member is substantially cylindrical.

References Cited in the file of this patent

UNITED STATES PATENTS

| | | |
|---|---|---|
| 2,406,924 | Stalker | Sept. 3, 1946 |
| 2,896,881 | Attinello | July 28, 1959 |
| 2,929,582 | Munro | Mar. 22, 1960 |

FOREIGN PATENTS

| | | |
|---|---|---|
| 811,422 | Germany | Aug. 20, 1951 |